(No Model.)

J. M. HARTNETT.
AUTOMATIC OILER FOR CRANK PINS.

No. 314,934. Patented Mar. 31, 1885.

WITNESSES:
INVENTOR:
J. M. Hartnett
BY
ATTORNEYS.

UNITED STATES PATENT OFFICE.

JOHN M. HARTNETT, OF LYONS, KANSAS.

AUTOMATIC OILER FOR CRANK-PINS.

SPECIFICATION forming part of Letters Patent No. 314,934, dated March 31, 1885.

Application filed November 28, 1884. (No model.)

*To all whom it may concern:*

Be it known that I, JOHN M. HARTNETT, of Lyons, in the county of Rice and State of Kansas, have invented a new and Improved Automatic Oiler for Crank-Pins, of which the following is a full, clear, and exact description.

The object of my invention is to provide an oiler for use upon the crank or wrist pins of steam-engines and on other machinery where cranks are employed to give a constant and uniform supply of oil to the bearing-surface.

The invention consists of the combinations of parts and their construction, substantially as hereinafter fully set forth, and pointed out in the claims.

Reference is to be had to the accompanying drawings, forming a part of this specification, in which similar letters of reference indicate corresponding parts in both the figures.

Figure 1:
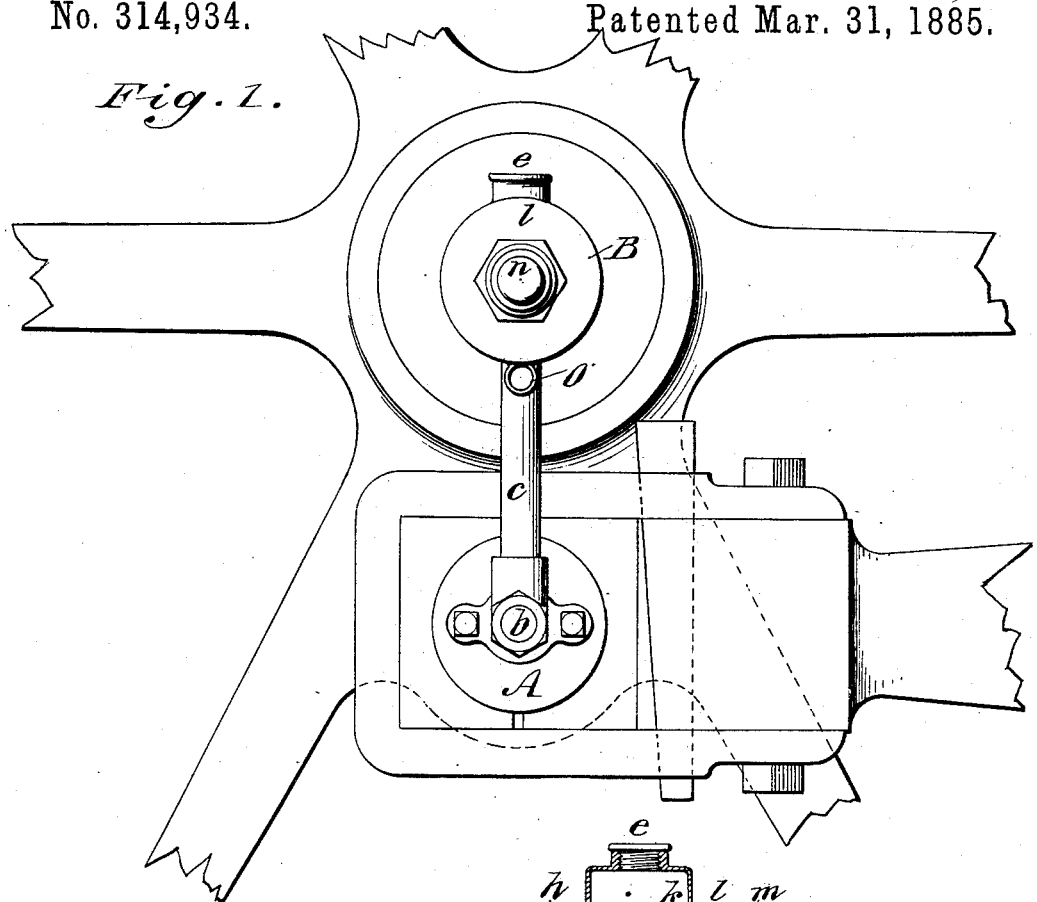
Figure 2:
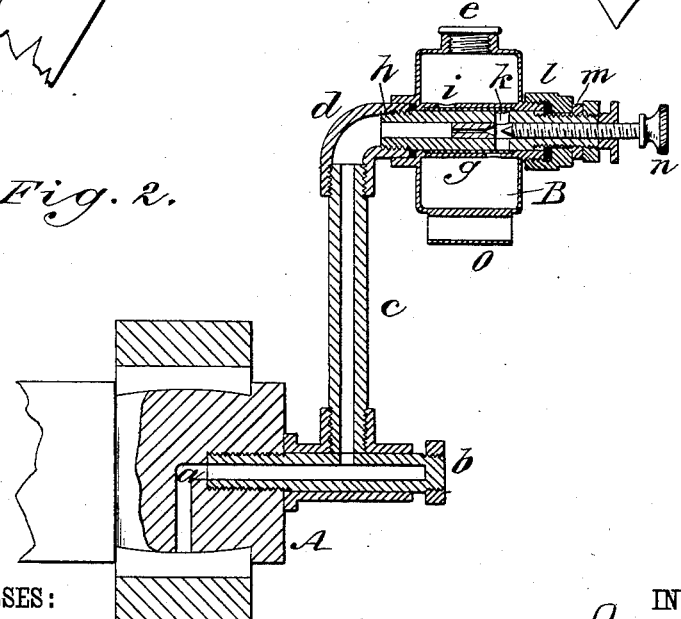

Figure 1 is a side view of a crank-wheel with my improved oiler applied. Fig. 2 is a section through the crank-pin and oiler in a plane at right angles to Fig. 1.

The crank or wrist pin A is formed with an aperture, $a$, extending inward from the face of the pin upon the axial line, and thence at a right angle to the outer bearing-surface. Into the aperture $a$ is screwed a hollow plug, $b$, to which a tube, $c$, is attached by a coupling-sleeve, so that the tube extends at a right angle. On the outer end of the tube is attached a quarter-bend, $d$, that carries the oil-cup and its parts.

The oil-cup B, made of metal or glass alone, or combined, is preferably of hollow cylindrical form, and provided with a feeding-cap, $e$, at one side. At its center it is formed with a transverse tube, $g$, which forms a sleeve around the fixed tube $h$, that is screwed into the end of the quarter-bend $d$. The tube or sleeve $g$ is provided with apertures $i$, and the tube $h$ with apertures $k$, to allow passage of the oil to the aperture of the tube $h$, and thence to the tube $c$ and plug $b$, so that a continuous passage is formed for the oil from the oil-cup to the wrist-pin. The cup has an annular flange fitting over the quarter-bend $d$, and at its outer side is made with a similar flange that is threaded and receives a packing-gland, $l$, whereby the ends of the tube $h$ are made tight to prevent escape of oil. The end of the tube $h$ extending at the front of the cup is screw-threaded and provided with a set-nut, $m$, taking against the gland $l$, so as to hold the cup up to place, and in the outer end of the tube $h$ is a screw-plug, $n$, that can be screwed in to close the aperture $k$ more or less, and thus regulate the escape of oil. This plug is held in place by a set-nut.

The tube $h$, holding the oil-cup, projects from the center line of the shaft, so that in the rotation of the crank-pin the tube $h$ and the oil-cup simply rotate with the shaft, while the plug $b$ in the crank-pin moving with the latter, a centrifugal movement of the oil is set up from the oil-cup and through the tube $c$ and the plug to the wrist-pin, thereby keeping up a constant and uniform supply of oil that can be regulated according to the amount desired.

In order to fill the cup while the engine is running, it is only necessary to take hold of it to prevent its rotation with the tube $g$, and the cap $e$ can then be removed. I provide a loop, $o$, on the under side of the cup, for convenience in taking hold of it in order to stop its rotation. It will be understood that this rotation of the cup is only by friction of its bearings upon the tube $h$.

In the space between the tube $h$ and the sleeve $g$ for the passage of oil is a sleeve of wire-cloth, which, while allowing for the free passage of the oil, prevents any sediment from passing to the bearing.

Having thus described my invention, I claim as new and desire to secure by Letters Patent—

1. In an automatic oiler for engines, the apertured plug with its aperture connecting with a channel in the wrist-pin, said plug being sleeved or coupled to a tube, in combination with the elbow connected to said tube and to a second tube having transverse apertures covered by a tubular screen, together with an apertured oil-cup or receptacle suspended upon said second tube, substantially as and for the purpose specified.

2. In an automatic oiler for engines, the apertured plug with its aperture connecting with a channel in the wrist-pin, said plug being coupled or sleeved to a tube, in combination with the elbow connected to said tube and to a second tube having transverse apertures covered by a tubular screen, said apertured tube having a regulating-screw with its inner end arranged to fit into a socketed tube disposed in said apertured tube, together with the suspended oil cup or receptacle, substantially as and for the purpose set forth.

3. In an automatic oiler for engines, the apertured plug with its aperture connecting with a channel in the wrist-pin, said plug being coupled or sleeved to a tube, in combination with the elbow connected to said tube and to a second tube having transverse apertures covered by a tubular screen, said apertured tube having a regulating-screw with its inner end arranged to enter a socketed tube in the said apertured tube, and the oil cup or receptacle sleeved upon said apertured tube and having the hand-hold or loop, substantially as and for the purpose set forth.

JOHN M. HARTNETT.

Witnesses:
EDWARD RHEIMS,
E. W. LOTHROP.